(No Model.) 7 Sheets—Sheet 1.
W. W. COULTER.
MACHINE FOR SHARPENING SAWS.

No. 452,691. Patented May 19, 1891.

Fig. 1.

William W. Coulter.
Inventor

Witnesses (No Model.) 7 Sheets—Sheet 2.
W. W. COULTER.
MACHINE FOR SHARPENING SAWS.

No. 452,691. Patented May 19, 1891.

Fig. 2.

Witnesses
L. S. Elliott

William W. Coulter
Inventor
by [signature]
Attorney (No Model.) 7 Sheets—Sheet 4.
W. W. COULTER.
MACHINE FOR SHARPENING SAWS.

No. 452,691. Patented May 19, 1891.

Fig. 4.

William W. Coulter,
Inventor

Witnesses
by
Attorney (No Model.)  
7 Sheets—Sheet 5.

W. W. COULTER.
MACHINE FOR SHARPENING SAWS.

No. 452,691. Patented May 19, 1891.

Fig. 5.

Witnesses

William W. Coulter,  
Inventor by ________ Attorney (No Model.) 7 Sheets—Sheet 6.

W. W. COULTER.
MACHINE FOR SHARPENING SAWS.

No. 452,691. Patented May 19, 1891.

Fig.6.

Witnesses
Eugene Johnson
H. L. Beall.

William W. Coulter.
Inventor
by [signature]
Attorney

THE NORRIS PETERS CO., PHOTO-LITHO., WASHINGTON, D. C.

(No Model.)

W. W. COULTER.
MACHINE FOR SHARPENING SAWS.

No. 452,691. Patented May 19, 1891.

Fig. 9.

Witnesses
G. S. Elliott
Eugene Johnson

William W. Coulter.
Inventor
by [signature]
Attorney

UNITED STATES PATENT OFFICE.

WILLIAM W. COULTER, OF EATON, ILLINOIS.

MACHINE FOR SHARPENING SAWS.

SPECIFICATION forming part of Letters Patent No. 452,691, dated May 19, 1891.

Application filed November 20, 1890. Serial No. 372,026. (No model.)

*To all whom it may concern:*

Be it known that I, WILLIAM W. COULTER, a citizen of the United States of America, residing at Eaton, in the county of Crawford and State of Illinois, have invented certain new and useful Improvements in Machines for Sharpening Saws; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.
This invention relates to improvements in machines for sharpening and jointing hand or crosscut-saws.

The object of the invention is to provide a machine or apparatus by means of which a saw can be sharpened and jointed without removing the same from the holder, the apparatus also embracing means whereby saws having different numbers of teeth can be sharpened and jointed, gages being provided for properly spacing the sharpening-files as well as for changing the inclination of said files and adjusting the jointing-file, the apparatus being so constructed and organized that the sharpening-files can be thrown out of an operative position while the jointing is being done.

The object of the different parts of the invention will hereinafter more fully appear, and the novelty set forth in the claims.
In the accompanying drawings, which illustrate the invention and form a part of this specification.

The mechanism constituting my apparatus is assembled upon a frame of the construction shown in the drawings, the parts thereof being securely attached to each other.

1 refers to the driving-shaft, which is hung in suitable bearings attached to the central horizontal beams *a a* of the frame. This shaft on one end beyond the horizontal beam of the supporting-frame has rigidly keyed thereon the main driving-wheel 2, motion being imparted to said shaft preferably by a crank-handle. The driving-wheel 2 meshes with a pinion 3 on the shaft 4, said shaft being hung in bearings projecting from the uprights *b b*, and carries near its opposite end, though within the frame, a large gear-wheel 5, which in turn meshes with a pinion on the shaft 6, said shaft carrying at one end a fly or balance wheel 7. This shaft between the pinion 8 and its opposite bearing carries a gear-wheel 9, which is loosely mounted thereon, and is adapted to be shifted in and out of gear with a rigid key on said shaft to rotate there with and independent thereof, as it may be positioned. This loosely-mounted gear-wheel on the opposite side from its clutch-face is provided with a hub 10, having an annular flange, with which a bifurcated arm 11, depending from a sliding bar 12, engages, said sliding bar being adapted to be reciprocated or thrown as the apparatus is set to joint or sharpen the saw. The gear-wheel 9 is normally thrown in contact with its key by a spiral spring 13, which encircles the shaft, and to the side of said gear-wheel is pivoted a spring-actuated pawl 14, which passes through a recess in the hub and engages an annular recess in the shaft to retain the gear-wheel out of engagement with its key, the said pawl being released by contact with an arm 15, carried by the rock-shaft 16. One end of the shaft 6 carries a miter-wheel 17, which meshes with a miter-wheel 18 on the vertical shaft 19, said vertical shaft carrying at its upper end a miter-wheel 20. This shaft 19 is supported in suitable bearings which project from the frame of the machine, and the miter-wheels mounted thereon are of the same size, the upper one meshing with a double gear-wheel 21, mounted on a stub-axle and presenting peripheral and beveled gear-teeth, as shown, the peripheral teeth meshing with the pinions 22 and 23, the pinion 23 being merely for the purpose of connecting the pinion 24 with 21. The pinions 22 and 24 impart proper movement to the saw-sharpening mechanism, consisting of reciprocating files, the construction and operation of which will be hereinafter described.

25 refers to the saw carrier and holder, which consists of a flanged disk, which is loosely mounted centrally on a rigid bearing $c$. This disk rests upon a circular table $d$, and just beyond the said table the disk is provided with depending teeth 26, with which a worm 27 on one side of the cylinder 28 engages, said cylinder having on its opposite side teeth 29, with which the pinion 30 on shaft 31 engages. The circular disk $d$ is cut away adjacent to the worm-wheel to provide a space in which said worm-wheel and pinion can operate.

The shaft 31, hereinbefore referred to, has loosely journaled on its projecting end a gear-wheel 32, one side of which is provided with a clutch which engages with projections on the shaft, while the opposite side is formed with a hub having an annular flange, the construction of the gear-wheel and its parts being similar in construction to the one 9 on the shaft 6, and is operated by a bifurcated arm 33, projecting from the sliding bar 12, which engages with the annular flange 34 to laterally move the gear-wheel upon its shaft, a spring being provided for throwing it in the opposite direction, as well as a spring-actuated pawl, which enters an annular recess in the shaft to retain the gear-wheel in a loosely-journaled position, said pawl being tripped by an arm 35 on the rock-shaft 36. The laterally-movable gear-wheels 9 and 32 are indirectly connected to each other in order to be thrown in and out of connection with their shafts by the bifurcated arms 11 and 33 on the sliding bar 12, so that when said sliding bar is shifted one of the said gear-wheels will be out of engagement with its shaft and the other in engagement. The bar 12 is shifted by means of an arm 37, the bifurcated end of which embraces a pin on said bar, while its opposite end is rigidly connected to the rock-shaft 38. The shaft 38 is rocked by means of an arm 39, operated by the lever 42, the pivoted bars of which play in the apertured projections 40 of said arm, springs being interposed, which provide a tension on the shaft. The lever 42 is loosely pivoted on the rock-shaft, the upper end thereof traversing a curved plate $e$, having notches, as shown, with which engages a spring-actuated catch, said catch being released by the hand-lever. The lever 42 at a suitable distance above its fulcrum has pivoted thereto curved arms 43 and 44, to the outer ends of which are connected by means of cranks 45 and 46 the rock-shafts 16 and 36. When said lever is shifted from one side of the apparatus to the other, the rock-shafts 16, 36, and 38 will be partly turned, the rock-shaft 38 moving the slotted arm 37 to one side, thereby actuating the sliding bar 12, which carries the bifurcated arms 11 and 33, thus throwing one of the laterally-movable gear-wheels in connection with its shaft, while the other is thrown out. At the same time the rock-shafts 16 and 36 are moved so as to throw the arm 15 or 35 toward the gear-wheels just mentioned, so that as said gear-wheels rotate the spring-pawls carried thereby will be operated upon to release the same from the annular recess in the shaft and permit the gear-wheel to be moved thereon. As this movement does not commence immediately upon the shifting of the lever, which is done while the apparatus is in motion, one of the apertured members 40 is pressed by the movement of the lever, so as to react and throw the shaft 38 at the proper moment. By moving the lever 42 to the right the filing or sharpening mechanism is placed in an operative position, and when the lever is thrown to the left said filing or sharpening mechanism, though it still moves, is raised so as to be out of operative position, and while so positioned the saw can be jointed.

Figure 1:
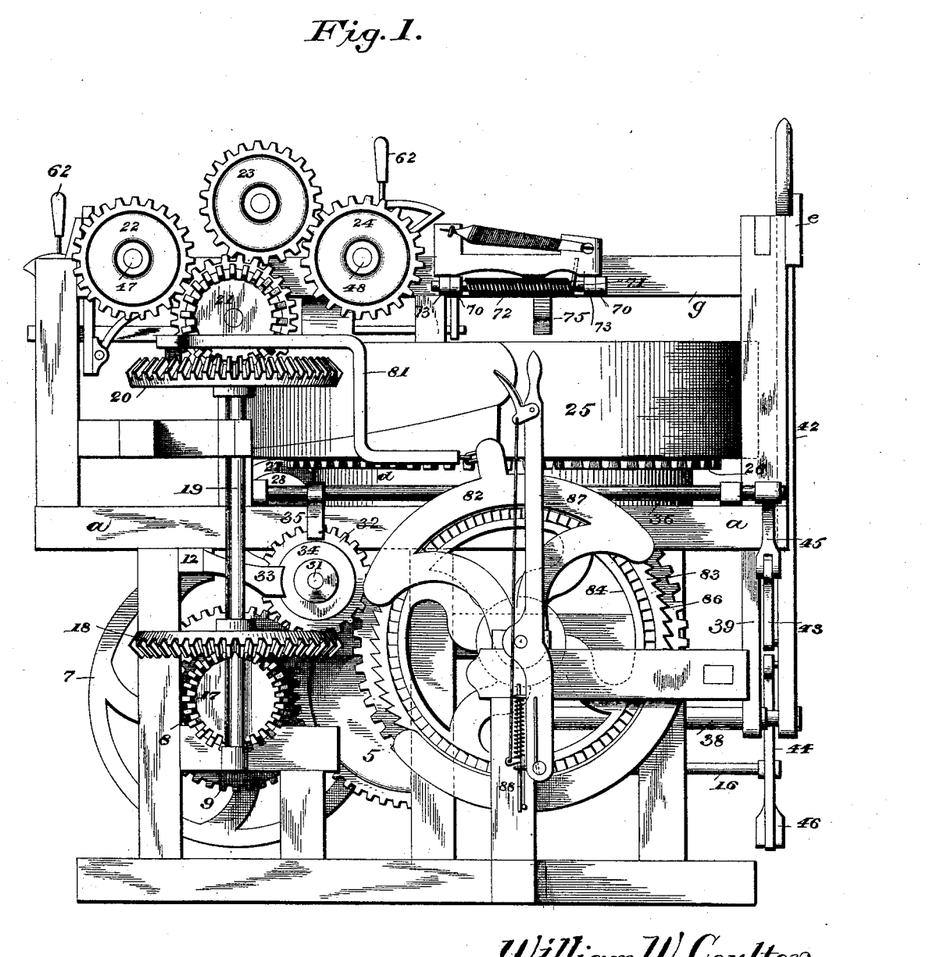
Figure 1 is a side view.
Figure 2:
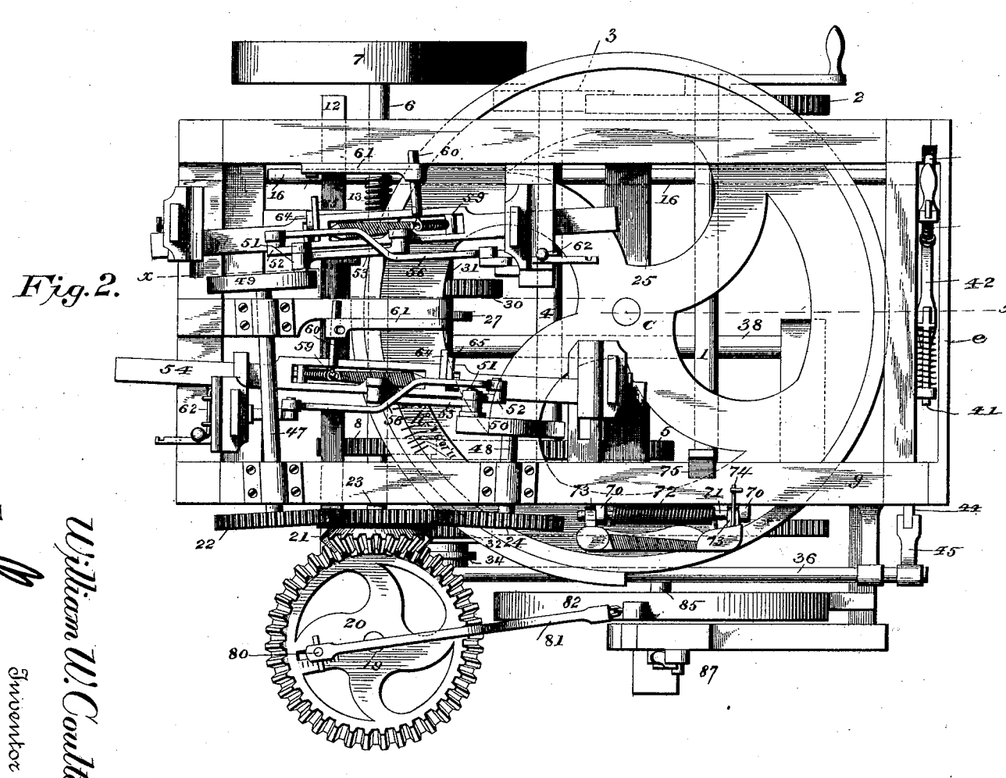
Fig. 2 is a plan view.

The saw sharpening or filing mechanism is driven from the gear-wheels 22 and 24, said gear-wheels being provided with shafts 47 and 48, which are suitably journaled upon the frame and are provided on the opposite ends from the gear-wheels with wrist-wheels 49 and 50. These wrist-wheels are provided not only with wrist-pins 51, but also with crank-arms 52, which are attached to the outer ends of said wrist-pins. From the wrist-pins extend pitmen 53, which connect with blocks properly secured to the guide-bars, which form a part of the file-holders. The ends of these guide-bars pass freely through openings in vertically-adjustable plates 55, which pass through vertically-apertured brackets $f$, carried by projecting portions of the main frame, said projecting portions being slotted, so that the brackets can be laterally adjusted thereon. To the ends of the crank-arms 52 are secured bent pitman-rods 56, the opposite ends thereof being connected by a rock-shaft 57 to the lower end of the plate 55½ by a short transverse shaft, which is suitably journaled thereto, said shaft carrying at its outer end a cam 58, which is raised and lowered at each reciprocation of the guide-bars 54, the function of said cam 58 being to elevate one end of the guide-bar, so that the file will be out of engagement with the saw, it being my intention that the file shall only operate when moving in one direction. As the guide-bar 54 passes through quite a wide opening in the plate 55½, I provide said guide-bar with means for holding the same constantly depressed, and said means consists of a bar 59, which is pivotally attached to the guide-bar 54 and is encircled by a spiral spring, said spring bearing upon an eye carried by the rod 60, which is adjustably supported by the bracket 61, one end of said bracket being slotted for the proper vertical adjustment of the rod 60. The ends of the guide-bars adjacent to the plate 55½ can be held normally elevated by moving the bent levers 62, the ends of which are bent at proper angles, and the handle portion of said lever can engage with the notched plates adjacent thereto, so that when in engagement with the outer notches the guide-bars will be held elevated. When it is not desired to elevate the guide-bars, the levers are placed in the position shown in Fig. 2. Each of the plates 55 and 55½ is vertically adjustable in its supporting-brackets $f f$, and by making the proper adjustments the proper depth of cut will be given to the files. The brackets $f f$ are laterally adjustable in the slotted horizontally-projecting portions of the main frame, which sustain said brackets, and these brackets have gage-pins, which are adapted to be placed to register with the gage plates or marks, which can be formed on or attached to the parts $f'$, which support said brackets. The guide-bars 54 on their under sides are provided with recessed projecting portions 63, in which are placed the points of the files, while the shanks thereof are secured in a movable holder or socket upon which is formed an arm 64, which is adapted to be moved over a segmental and slotted gage-plate 65 and be clamped thereto, and by properly setting this arm 64 the angle of the file may be varied, or the same can be turned in order to properly cut the teeth.

It will be observed that the filing or sharpening mechanism is so constructed that the files reciprocate alternately and that they only cut while moving in one direction and that said files can be adjusted within the holders so that saws with different shaped teeth can be sharpened. It will also be observed that the guide-bars which carry the files can be adjusted vertically for regulating the depth of the cut and laterally, so that the files are adapted to sharpen points of different widths, and also that both ends of the guide-bars to which the file-holders are attached may be independently adjusted, so that the files can be cut at proper angles. The file holding and operating mechanisms are similar in construction, though reversed, the parts being positioned so that the files will be located and operated immediately above the saw-carrying frame 25.

The device for jointing or filing the upper edges of the teeth of the saw is secured to the upper horizontal beam $g$ of the frame, said beam having laterally-extending eyes 70, which support a bar 71, upon which is placed a spring 72, one end of which bears against the file-carrying frame, which has ears 73, through which the bar 71 passes. The file for jointing is secured in a frame in any suitable manner, which frame can be moved laterally upon the bar 71 and carries a pin 74, which, when it is desired to hold the jointing-file out of engagement with the saw-teeth is passed under a bent pin. The file-carrying frame is formed with a stop or projecting portion which is adapted to engage with a gage 75, which will limit the downward movement of the frame, so that it can be properly positioned.

The saw-carrying frame 25 has hinged thereto a section 25½, said section adjacent to its hinge having a recess to receive the handle of the saw, while the opposite end has a staple which passes through an opening in the saw-carrying frame, and said section or leaf is retained against the saw-carrying frame by a wedge or block. The saw-carrying frame is also recessed opposite the recess in the hinged section 25½. The saw-carrying frame is provided on its upper edge with a gage-pin 25¼, and the last tooth of the saw is placed to register therewith when the same is clamped upon the frame 25.

Hand and crosscut saws are manufactured with different numbers of points or teeth to the inch, said saws being usually designated by the number of teeth to the inch, and this apparatus is adapted to sharpen saws of this description. For instance, if the saw to be sharpened is numbered 7, the saw-carrying frame is moved until the pointer 25¼ registers with "No. 7" on the gage-plate $h$. The gages connected with the reciprocating guide-bars of the file-holders are also set at 7. The miter-wheel 20, which is provided with a slot and gage-marks adjacent thereto, also carries an adjustable wrist-pin 80, to which the pitman 81 is secured, said wrist-pin also being set at "7." Now as the driving mechanism is operated, according to the position of the wrist-pin 80, the pitman 81 will have a longer or shorter stroke, and this pitman, being connected to the segment 82, which is provided with spring-pawls of ordinary construction, will engage with the peripheral ratchet-teeth 83 on the wheel 84, rigidly keyed to the shaft 85, which also carries a cog-wheel, which meshes with the peripheral teeth of the double cog-wheel 32 when the same is thrown, as hereinbefore described, to rotate with its shaft 31, thus transferring the motion imparted to the large cog-wheel 86 through the pinion 32 to its shaft 31, and from thence to the worm-wheel which turns the saw-frame, and while this large cog-wheel 86 is in mesh with the cog-wheel 32 the gear-wheel 9 turns freely on its shaft. To the frame, on a line with the end of the shaft 85, is fulcrumed a lever 87, which carries at its lower end a spring-actuated pawl which engages with the ratchet-teeth on the side of the wheel 84, so that said ratchet-wheel and parts connected thereto can be turned by manipulating said lever. This lever also carries a sliding bar 88, which is adapted to engage with a pin, as shown, for holding the lever 87 in a vertical position when not utilized for adjusting the ratchet-wheel. By properly manipulating this lever 87 the saw-carrying frame can be adjusted so as to bring the gage-points 25¼ to the desired mark on the gage-plate $h$.

Figure 3:
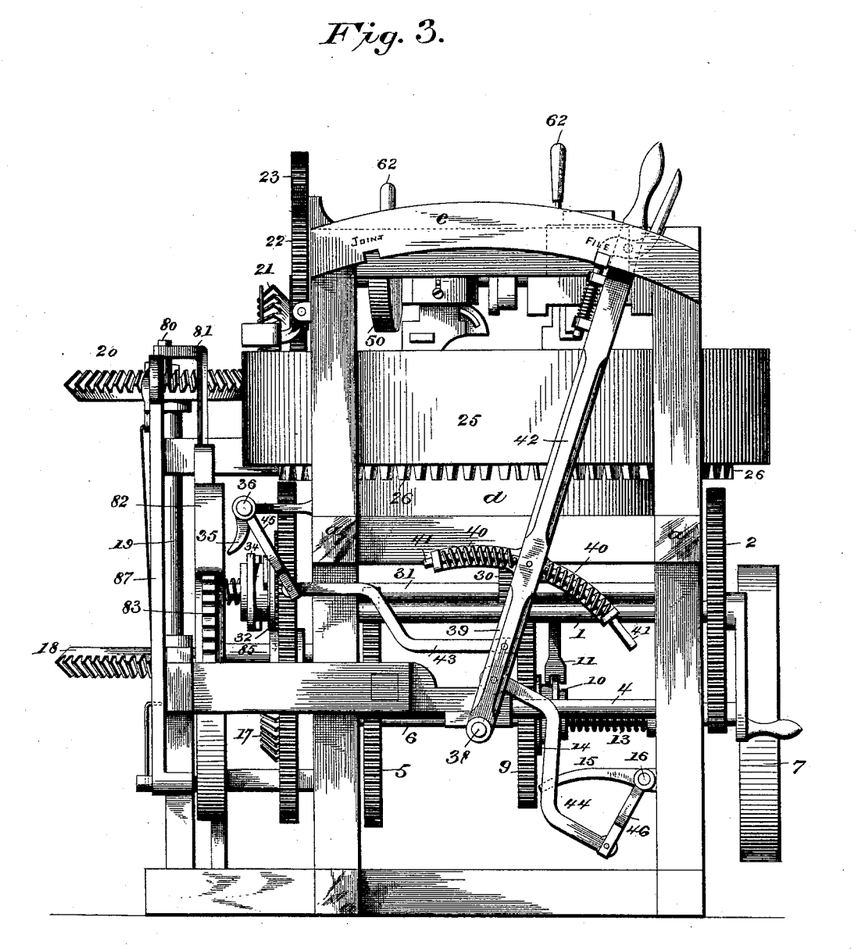
Fig. 3 is an end view.
Figure 4:
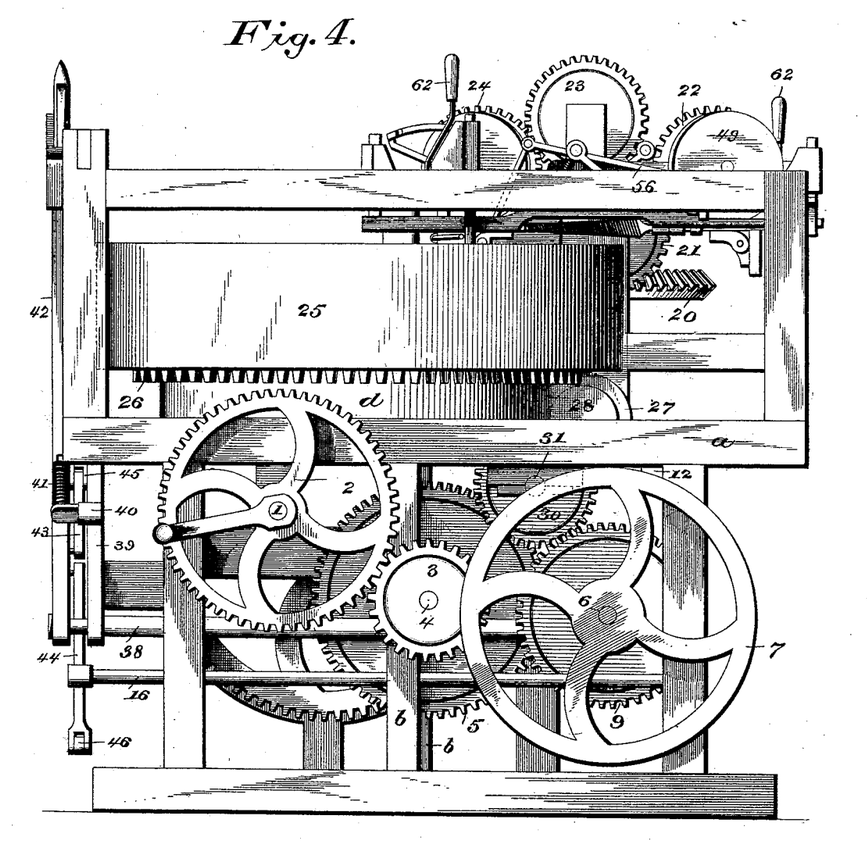
Fig. 4 is a view of the side opposite to that shown in Fig. 1.
Figure 5:
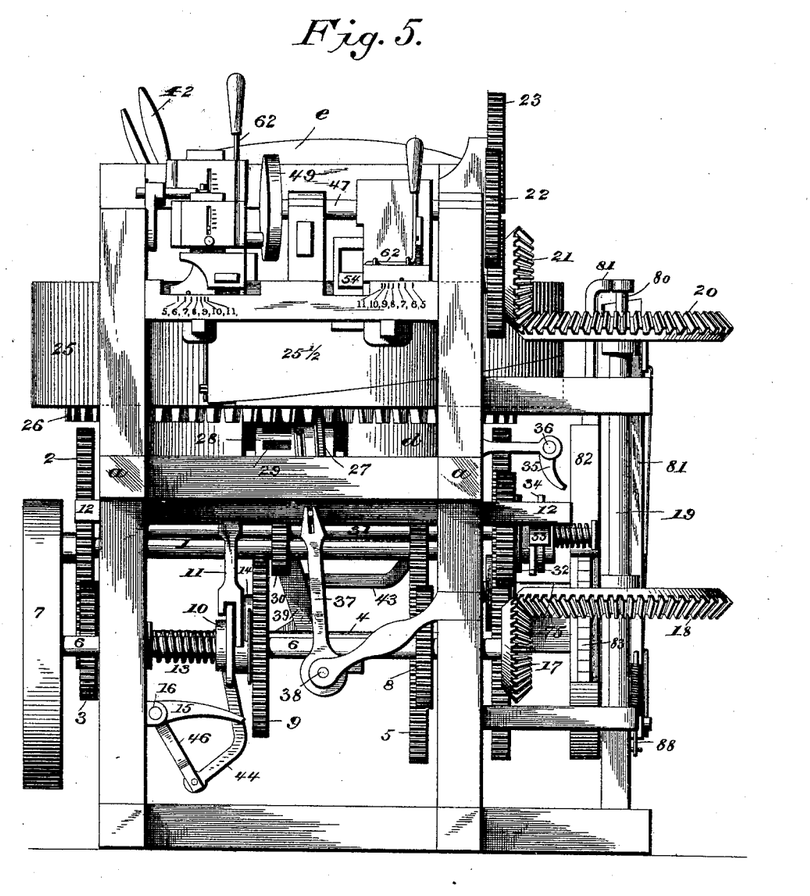
Fig. 5 is a view of the end opposite to that illustrated in Fig. 3.
Figure 6:
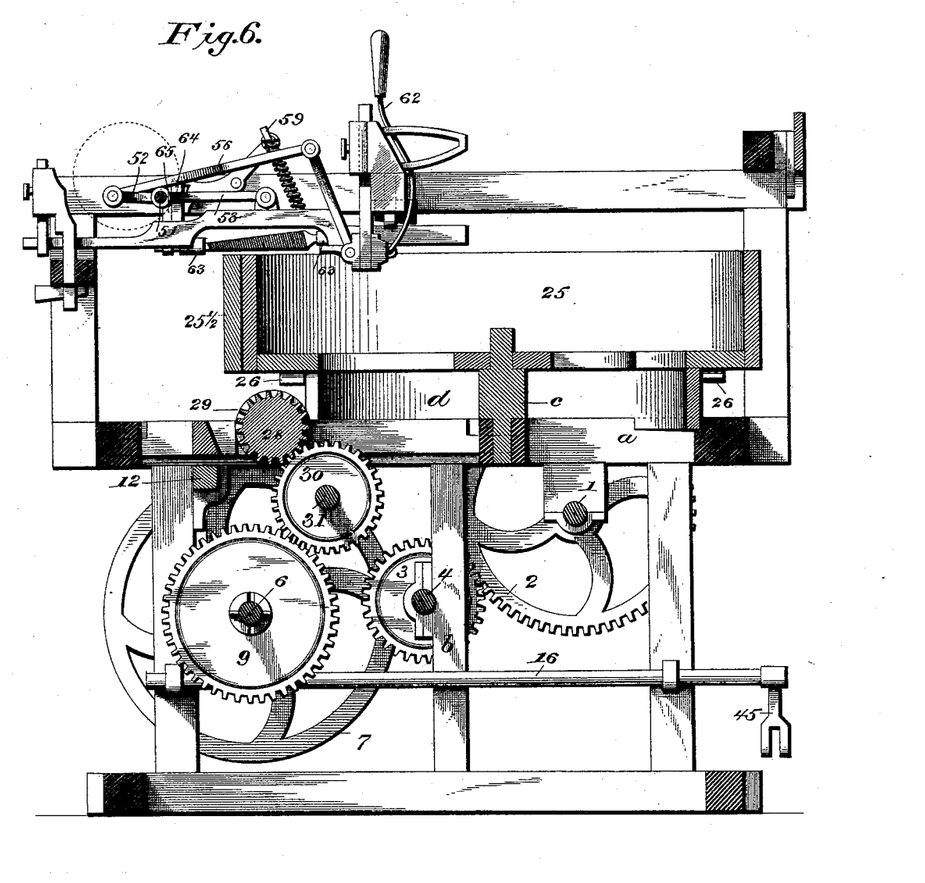
Fig. 6 is a sectional view taken on the line *x x*, Fig. 2.
Figure 7:
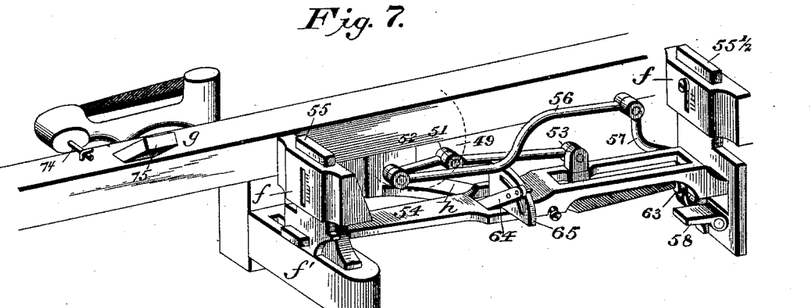
Fig. 7 is a detail perspective view of a part of the saw-sharpening mechanism.
Figure 8:
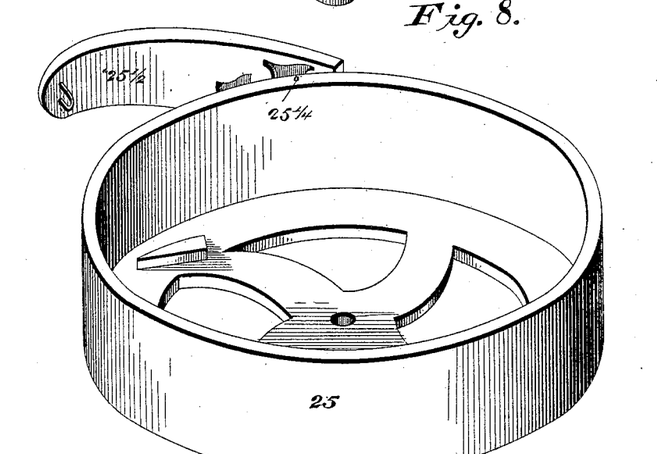
Fig. 8 is a perspective view of the rotary saw-holder.
Figure 9:
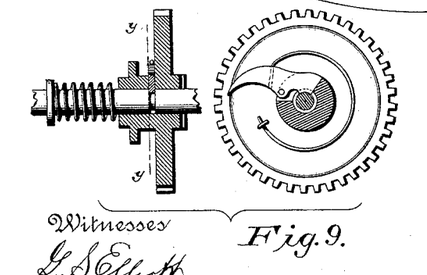
Fig. 9 is a detail view of the clutch mechanism and adjacent parts.

When it is desired to sharpen a saw, it is placed in the saw-carrying frame and locked therein, as previously described. The lever 42 is then thrown to the right side of the apparatus, as shown in Fig. 3. All the gages having been properly set, the lever 87 is reciprocated until the gage-pin on the saw-carrying frame is opposite the proper gage-mark on the plate $h$, when it is locked in a vertical position, as shown. When the driving-wheel is turned, motion will be imparted to the shaft 6 through the miter-wheel 17, to the miter-wheels 18 and 20, and from thence communicated to the mechanism for operating the reciprocating file-holders, the gear-wheel 9 remaining idle. As the miter-wheel 20 rotates, the pitman 81 connected thereto will be given the proper stroke, which is transferred to the segment 82, and the pawls attached to said segment, engaging with the ratchet-wheel, turn its shaft and cog-wheel 86 mounted thereon, which in turn rotates the laterally-movable pinion 32, which is positioned to gear with its shaft, and as said shaft rotates the worm-wheel is turned to revolve the saw-carrying frame, which moves at a proper speed to insure the files entering the interdental spaces, said files being adjusted so as to cut either at a vertical angle or at an oblique angle, thus giving the proper pitch to the teeth. Each reciprocating file acts upon alternate teeth, and each tooth is subjected to two or more direct strokes of the file. If after each tooth has been filed or sharpened it is required to repeat the same, the lever 87 can be again manipulated to completely revolve the saw-carrying frame and bring it back to the gage-mark. After the filing or sharpening process has been satisfactorily completed the lever 42 is thrown to the opposite side of the machine, which movement will have the effect, as hereinbefore described, of throwing the laterally-movable gear-wheel 32 out of connection with its shaft and the gear-wheel 9 in connection with its shaft, thus putting out of connection with the driving mechanism a number of the parts of the apparatus. Now before the jointing proceeds the small levers attached to the crank-bars 62 are thrown, so as to engage with the outer notches of the segments with which said bars engage, which movement will raise the file-carrying frames and hold them out of engagement with the teeth of the saw, and though the file-holders may reciprocate they will not act upon the saw. As the driving-wheel rotates, the saw-carrying frame 25 will be turned at a comparatively high rate of speed compared with its previous movement, and the jointing-file coming in contact with the upper edges of said teeth will file them, so that they will be made level or jointed. The saw-carrying frame may be provided with means for holding in place several saws.

It will be noted that by the use of the hereinbefore-described apparatus a saw can be sharpened and jointed after being properly placed in the apparatus without removing it therefrom.

Having thus described my invention, what I claim as new, and desire to secure by Letters Patent, is—

1. The combination, in a machine for sharpening reciprocating saws, of an intermittently-rotating saw-holder provided with a clamp for holding the saw-blade vertically upon the periphery thereof, a pair of alternately-reciprocating file-holders, and gearing connected with the driving mechanism for reciprocating the file-holder and rotating the saw-holder, substantially as set forth.

2. In a machine for sharpening reciprocating saws, the combination of a horizontally-rotating saw-holder provided on its periphery with a clamp for holding in a vertical position thereon the saw-blade, and reciprocating file-holders located above the saw-holder and arranged at an angle with each other, said file-holders being adjustable both vertically and longitudinally and provided with means whereby they are alternately elevated and depressed, substantially as set forth.

3. The combination, with a horizontal rotary saw-holder geared so as to advance step by step, of the reciprocating file-holders having adjusting means and gages whereby they can be set to correspond with the advanced movement of the saw-holder, and a clamp attached to the periphery of the horizontally-revolving saw-holder to maintain the saw-blade in a vertical position thereon, so that the teeth will be above the upper edge of the saw-holder and clamp, substantially as set forth.

4. In combination with a rotary saw-holder geared to advance step by step, a pair of reciprocating file-holders supported in frames which are provided with means for adjusting the same vertically and laterally, as shown, the file-holders being disposed at an angle with each other, together with slotted segments to which levers are attached for clamping the files at an angle with the holders, substantially as set forth.

5. In a saw-sharpening machine having a horizontally-rotating saw-blade holder, the combination of the reciprocating file-holders geared to each other so as to reciprocate alternately, the reciprocating file-holders to which the files are attached being driven by a pitman, as shown, together with bars connected to a rock-shaft carrying a cam for elevating one end of the pawl-carrying bars, substantially as set forth.

6. The combination, with a horizontally-rotating saw-holder provided with a clamp for holding a saw-blade vertically thereon, of reciprocating file-holders constructed substantially as shown and provided with rocking cams for elevating one end of said file-holders, so that they will be out of contact with the saw, together with movable bars encircled by springs for depressing the file-holders when they are in contact with the saw, and gearing, substantially as shown, for alternately raising and lowering and reciprocating the file-holders, for the purpose set forth.

7. In a saw-sharpening apparatus having a horizontal and intermittently-rotating saw-holder with means for holding the blade vertically thereon, the combination of the reciprocating file-holders, one end thereof being elevated vertically by rocking cams, levers carried by said file-holders and adapted to be thrown manually for holding the reciprocating bars elevated and out of contact with the saw, and gearing, as shown, for reciprocating the file-holders as the said holding-frame is advanced, substantially as set forth.

8. The combination, with an apparatus for sharpening saws, of the reciprocating file-holders supported in vertically and laterally adjustable frames, clamps carried by the file-holders and adapted to engage with the shanks of the files, and a lever attached to one of the clamps so as to engage with a slotted segment carried by the file-holder for changing the angles thereof, substantially as set forth.

9. In an apparatus for sharpening saws, a rotary saw-holder geared to the mechanism for reciprocating the file-holders, said file-holders being geared to each other, substantially as shown, and provided with shafts upon which are secured wrist-wheels, said wrist-wheels carrying two pitmen to each file-holder, one for reciprocating the file-holder and the other for actuating the rocking cam which elevates said file-holder, so that the files carried thereby operate upon the teeth when moved in one direction only, and a spring-actuated bar for depressing the file-holders, substantially as shown, and for the purpose set forth.

10. In combination with the reciprocating file-carrying bars, rods 59, pivotally secured thereto and provided with springs, said springs being adapted to contact with the laterally-projecting arms carried by the adjustable bracket, substantially as set forth.

11. In a saw-sharpening apparatus, the combination of a file-holder adapted to reciprocate over and against the saw-teeth, the guides through which the file-holding frame passes being independently adjustable both vertically and laterally, the parts being provided with gages, and rock-levers 62, adapted to engage with one end of the file-holding frames to elevate said frames and hold them out of contact with the saw-teeth, substantially as set forth.

12. The combination, in a saw-sharpening machine having a rotary saw-holder and alternately-reciprocating file-holder, of a pivoted segment operating upon a ratchet-wheel through which the rotary motion is imparted to said saw-holder, and a pitman adjustably secured to the driving-wheel 20, so that the speed of the saw-holder can be varied in accordance with the speed of the file-holders, substantially as set forth.

13. In a saw-sharpening apparatus having a saw-holder and reciprocating file-holders, the combination of a gear-wheel 20, carrying an adjustable pitman-rod, a pawl-carrying segment 82, said segment engaging ratchet-teeth, and a gear-wheel rigidly mounted on the shaft of the ratchet-wheel and adapted to engage with a pinion 32 for turning the shaft 37 to operate a worm which rotates the saw-holder, substantially as set forth.

14. In a saw-sharpening apparatus, a shaft 38, carrying a bifurcated arm adapted to reciprocate the bar 12, and bifurcated arms projecting from said bar and engaging the gear-wheels 9 and 34 to alternately connect them with their shafts, substantially as set forth.

15. The combination, in a saw-sharpening apparatus, of a rock-shaft 38, operated by the lever 42, a bifurcated arm projecting from said rock-shaft and adapted to reciprocate a bar 12, and arms projecting from said bar and bifurcated at their ends to embrace annular flanges on the hubs of the gear-wheels 9 and 34, together with clutches and pawls for retaining said gear-wheels in and out of connection with their shafts, substantially as set forth.

16. In a saw-sharpening apparatus, the combination of the shafts 6 and 31, provided with gear-wheels having clutches mounted thereon, a movable bar 12, carrying projecting arms which engage with said clutches, a rock-shaft carrying a bifurcated arm 37, which engages with a sliding bar, the rock-shaft being actuated by a lever which also operates rock-shafts 16 and 36, and carrying-arms which engage with the clutches, so that the drive-wheels can be thrown in and out of gear, substantially as set forth.

17. In combination, the shafts carrying gear-wheels loosely mounted thereon and provided with clutches, said gear-wheels having spring-pawls which engage recesses in said shafts and project to be engaged by arms 15 and 36, carried by independent rock-shafts having cranks and curved bars for connecting the same to a lever, said lever also operating a rock-shaft 38, having a slotted arm 37, which engages with a sliding bar 12, having projections which engage with the annular flanges of the gear-wheels, so that when the lever is operated one of the wheels will be thrown in engagement with its shaft and the other out, substantially as set forth.

18. The combination, with a lever 42 and rock-shafts 16, 36, and 38, of the clutches and gear-wheels adapted to be thrown in and out of engagement with the shafts, substantially as described, together with an arm 39, having laterally-projecting members apertured for the passage of bars pivoted to the lever, springs encircling said bars, and means for holding said lever in a fixed position, substantially as set forth.

19. In combination with a saw-holder, a curved clamping-plate recessed adjacent to its hinged portion to receive a saw-handle and provided with means for securing the free end to the holder, said holder being correspondingly recessed, substantially as set forth.

20. In combination with a saw-holder 25, having on the under side depending teeth, a worm-wheel adapted to engage with said teeth to rotate the saw-holder, a pinion formed with the worm-wheel and adapted to be rotated either directly from the driving mechanism or from mechanism the speed of which can be regulated so that the saw-holder will rotate or advance step by step in unison with the sharpening mechanism, substantially as set forth.

21. In a saw-sharpening apparatus constructed substantially as shown, a ratchet-wheel having side and peripheral ratchet-teeth, a segment having pawls for turning the same, a gear-wheel rigidly attached to the shaft upon which the ratchet-wheel is mounted for imparting motion to the saw-holder, a lever having a spring-pawl for manually rotating the ratchet-wheel and setting the saw-holder, and a pitman adjustably connected to the drive-wheel 20, together with the saw-filing mechanism, constructed substantially as shown, the parts being so connected that the saw-filing mechanism and saw-holder will operate in unison, substantially as shown, and for the purpose set forth.

22. In an apparatus for sharpening saws, the combination of a rotary saw-holder, a pivoted spring-pressed jointing-file-carrying frame, and a gage for limiting the downward movement thereof, substantially as set forth.

23. The combination, in a saw-sharpening apparatus constructed substantially as shown, of a rotary saw-holding frame, file-holding frames pivotally secured above the same, said file-holding frames having a projecting portion to which a jointing-file is secured, and a gage which contacts with said projecting portion, substantially as set forth.

24. The combination, in a saw-sharpening apparatus constructed substantially as shown and provided with a ratchet-wheel 83, having side and peripheral teeth, said ratchet-wheel being rigidly keyed upon a shaft carrying a cog-wheel, which imparts through intervening gearing a rotary motion to the horizontal saw-holder, said ratchet-wheel being rotated by means of an oscillating segment connected to the driving mechanism by an adjustable pitman-rod 81, so that the length of the oscillations of the segment can be varied, the gear-wheel to which the pitman is connected also gearing with the saw-sharpening mechanism, substantially as set forth.

In testimony whereof I affix my signature in presence of two witnesses.

WILLIAM W. COULTER.

Witnesses:
T. P. BARLOW,
LEVI WILKIN.